UNITED STATES PATENT OFFICE.

ANSIL MOFFATT, OF INDIANAPOLIS, INDIANA, ASSIGNOR TO ALBA MANUFACTURING COMPANY, OF INDIANAPOLIS, INDIANA, A CORPORATION OF INDIANA.

PROCESS FOR PRODUCING PIGMENTS.

No. 911,832.     Specification of Letters Patent.     Patented Feb. 9, 1909.

Application filed January 7, 1908. Serial No. 409,674.

*To all whom it may concern:*

Be it known that I, ANSIL MOFFATT, a citizen of the United States, residing at Indianapolis, in the county of Marion and State of Indiana, have invented certain new and useful Improvements in Processes for Producing Pigments, of which the following is a specification.

This invention consists in a process for producing a co-precipitated pigment consisting chemically of zinc oxid and barium sulfate in molecular proportions, said co-precipitation being produced from solutions containing zinc sulfate and barium chlorid.

It is well known that barium hydrate (or oxid) is a substance of high price in commerce owing to the difficulty of its manufacture, and therefore, a pigment made by the reaction of it with zinc sulfate would be very expensive, and hence an unimportant factor in commerce in competition with the present white pigments of commerce. Barium chlorid, however, is a salt abundant and cheap in commerce, and it can be procured in a state of great purity, suitable for use in making a valuable pigment by my process.

My process is carried out as follows: For each 1,000 parts by weight, of pigment desired to be produced, I take 178 parts, by weight, of pure calcium oxid. I put this into 3,000 parts of water, more or less, in a suitable tank or vat. I then prepare a pure solution of 776 parts, by weight, of crystallized barium chlorid, ($BaCl_2, 2H_2O$), in a suitable tank. I also prepare a pure solution of crystal sulfate of zinc, using 914 parts, by weight, of the formula $ZnSO_4, 7H_2O$. These different tanks are conveniently located with reference to each other.

Now, it is well known that oxid of calcium requires for complete solution about 800 times its weight of water, and therefore the 178 parts, by weight, of this oxid which I have taken would require for complete solution about 140,000 parts of water. As this ratio of water to calcium oxid in practical operations would cause or necessiate the use of enormous quantities of water, which would moreover have to be pure, the cost of a pigment would be greatly in excess of commercial requirements. Enormous tank facilities and other equipment would also be necessitated. To avoid this I use a smaller quantity of water, as stated above, say about 3,000 parts for 178 parts of calcium oxid. This quantity of water would therefore have in actual solution only two (2) per cent. of the calcium oxid,—the remaining 98 per cent. being in suspension. This being the case I proceed to add to this calcium oxid mixture, two (2) per cent. of the barium chlorid solution, mix well, and then add two (2) per cent. of the zinc sulfate solution, and again mix well. The result is that a portion of the calcium oxid becomes converted into calcium chlorid, while the barium and zinc are co-precipitated as barium sulfate and zinc oxid, and the water is ready to take up another two (2) per cent. of calcium oxid. The equation representing this action is as follows:

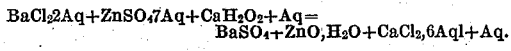

$BaCl_2 2Aq + ZnSO_4 7Aq + CaH_2O_2 + Aq =$
$\qquad BaSO_4 + ZnO, H_2O + CaCl_2, 6Aq1 + Aq.$ The solution of the calcium oxid takes place from the particles of calcium oxid in suspension in various periods of time, according to the character of the oxid used. The rate of solution I determine by proper methods for the calcium oxid actually selected for my use. Supposing it to be two minutes (which is a usual rate), I allow this period of time to elapse after the addition of the zinc sulfate solution described, and then I again add a portion of two (2) per cent. of the original barium chlorid solution, mix, then add two (2) per cent. of the original zinc sulfate solution and mix. This series of operations is repeated until I have added all of the barium chlorid solution and the zinc sulfate solution successively. I do not limit myself to the exact quantities of water here mentioned, or to the use of exactly two per cent. of the solution at each stage, since the percentages and quantities of water will vary with each other, but I use the proportions named rather as examples of the process used.

It is well known that chemical reactions require that the reacting bodies be in solution where exact equations are required, and hence by my process of bringing together the calcium oxid, barium chlorid and zinc sulfate, all in solution, I cause the production of exact equivalents of calcium chlorid, barium sulfate and zinc oxid, and I avoid the formation of sulfate of calcium or oxychlorid of zinc which might otherwise occur. And most important for my purpose, I avoid the precipitation of barium sulfate in advance of that zinc oxid, which would occur if all of the barium and zinc solutions were added at once, since if I did so, the zinc sulfate would react with the barium chlorid, producing barium sulfate and zinc chlorid, and then, as the calcium oxid gradually dissolved, the zinc chlorid would become partly oxychlorid and oxid as follows:

$$4ZnCl_2 + 3CaO, H_2O = ZnCl_2, 3ZnO, 3H_2O + 3CaCl_2.$$

Even if all of the zinc became oxid, the formation of the zinc oxid would not be simultaneous with the formation of the barium sulfate, hence there would be no co-precipitation, and the resulting pigment would be of no unusual value.

My invention thus consists in adding to a constantly regenerating solution of calcium oxid, the equivalent of the portion of calcium oxid really dissolved in barium chlorid and zinc sulfate, by determined stages, for the production of a co-precipitated pigment consisting of barium sulfate and zinc oxid in molecular proportions. When formed the precipitate may be washed free from calcium chlorid, drained and dried.

Having thus fully described my invention, what I claim as new and wish to secure by Letters Patent of the United States, is—

1. The process of producing a white pigment composed of co-precipitated barium sulfate and zinc oxid which consists in adding to a mixture of calcium oxid in water, barium chlorid and zinc sulfate consecutively in quantities equivalent to the calcium oxid dissolved, then allowing the water to resaturate with calcium oxid and continuing the operation.

2. The process of producing a white pigment composed of co-precipitated barium sulfate and zinc oxid which consists in adding to a solution of calcium oxid containing excess of calcium oxid over the amount soluble in the water present, barium chlorid and zinc sulfate consecutively at a rate equal to the speed of solution of the calcium oxid used.

In witness whereof I have hereunto set my hand and seal at Indianapolis, Indiana, this 31st day of December, A. D. one thousand nine hundred and seven.

ANSIL MOFFATT. [L. S.]

Witnesses:
J. A. MINTURN,
F. W. WOERNER.